UNITED STATES PATENT OFFICE.

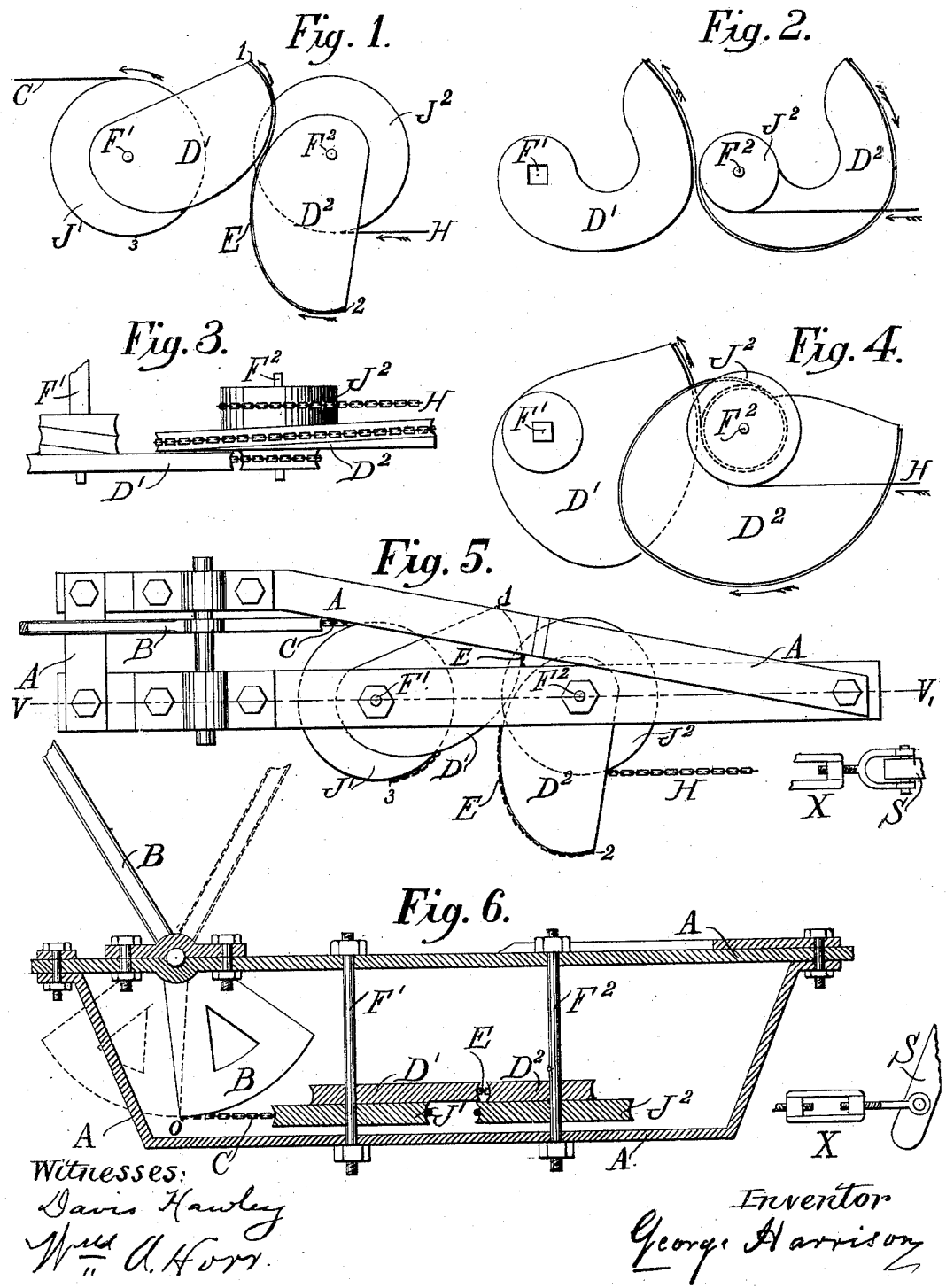

GEORGE HARRISON, OF CLEVELAND, OHIO, ASSIGNOR TO CHARLES EDGAR LAMB, OF WINTHROP, MASSACHUSETTS.

MECHANISM FOR OPERATING BRAKES.

SPECIFICATION forming part of Letters Patent No. 473,553, dated April 26, 1892.

Application filed January 9, 1891. Serial No. 377,221. (No model.)

*To all whom it may concern:*

Be it known that I, GEORGE HARRISON, a native of Scotland, and a citizen of Glasgow, in the county of Lanark, Scotland, and now residing in Cleveland, in the county of Cuyahoga and State of Ohio, have invented a new and useful Improvement in Mechanism for Operating Brakes or for Similar Purposes; and I declare the following to be a clear and exact description thereof, reference being had to the accompanying drawings, which form a part of this specification, and to the letters of reference marked thereon.

My invention relates to improvements in the mechanism of brakes, and has for its object to provide a simple and effective addition to such mechanism which will so adjust the rate of travel and the pressure applied in a brake or similar instrument that without correspondingly varying the force used and without requiring the hand or other source of power to traverse a great or inconvenient distance the result is a swift and easy travel of the brake or instrument to the point where force is required and the development when that point is reached of greatly multiplied pressure, the speed decreasing and the power increasing precisely where less speed and greater pressure are required. I attain these objects by the mechanism illustrated in the accompanying drawings, in which—

Figure 1 shows a combination of two disks D' and D², substantially of the same form, sections of an ellipse connected or geared to each other by a band or chain, pivoted in the center of one of their shortest diameters and having cast or fixed upon them round their pivots the pulleys J' and J². Fig. 2 is an alternative form of the same disks with their major and minor diameters continued in circular form till they join by an S-shaped curve, the disk D' fitted to have a handle fixed in its pivot and the disk D² having the circular pulley J² fixed round its pivot. Fig. 4 is another alternative form of these disks with the major and minor circumferences still farther continued in the form of a cone, the disk D' fitted to have a handle fixed in its pivot and D² having the circular pulley J² cast upon or fixed round its pivot. Fig. 3 is a side view of Fig. 4. Fig. 1 is the form of disk which seems best adapted to be used with a rod-lever, as in Figs. 5 and 6. Figs. 2 and 4 are the forms that seem best adapted to be used with the handle or wheel in ordinary use on cars. Fig. 5 is a plan, and Fig. 6 is a section, on the line V V of the whole device, fitted to the rod-lever motive and using the form of disks shown in Fig. 1, and showing also the attachment to the beginning of the brake mechanism.

A A A is a frame-work fitted under the platform of a car and having journals in both the upper and under sides to receive the axles F' and F² of the disks. D' is the first of these disks, shaped as described, with its pulley fixed thereon, and having in the center of its shortest diameter and passing through it and the pulley an axle F', working in its journals in the frame-work, having one end of the band E fastened to its periphery at 1.

B B is a cam-lever fulcrumed in the frame-work, having the band C, attached to it at o and to the pulley of disk D' at 3.

E is a band or chain fastened at one end on the periphery of disk D' at 1 and passing over to and around the periphery of disk D² to the point 2, to which it is fastened.

D² is the second disk, with its pulley J² fixed thereon, shaped as before described, placed in relation to D', so that the corresponding curves lie to the same side and so that the distance between their pivots is slightly over the major diameter of the ellipse, having the band E fastened to its periphery at the point 2, having passing through the center of its shortest diameter and of its pulley an axle F², working in its journals in the frame-work. To this pulley is attached the chain H, used as a convenient mode of transmitting the power and motion from it to the brake mechanism. This chain is shown as having upon it in a position convenient to the operator of the brake a simple contrivance for adjusting its length. S is the beginning of any ordinary brake mechanism in a car, which should include springs to withdraw the brakes when pressure is removed and any simple means for adjusting the lie of the brakes.

Having described the construction and combinations in my said invention, I will now proceed to show how it operates to attain the desired result.

Looking at Figs. 5 and 6, where the combination is in its first or open position, when power is applied to the lever B, and so communicated to D', it is obvious, seeing that the longest radius of the disk D' is operating on the shortest radius of the disk $D^2$, that the latter will be revolved at a higher speed than the former, and the travel of X will be greater than that of O, and consequently that the brakes will be brought up swiftly. As the motion of the lever continues, the proportions of the opposing radii of the disks change symmetrically until the lever reaches the indicated position, when the combination will stand so that the minor radius of D' is operating on the major radius of $D^2$ and the power is multiplied by the differences between the longest and shortest diameters of both the disks.

The merit of this my invention is made more plain by my having chosen for illustration a combination wherein the proportion of parts gives about the same total of travel to both the incoming and outgoing chains C and H, while yielding the increased speed at the beginning and the multiplied power at the end of the stroke; but it is obvious that both the total travel and the power developed may be varied as desired by altering the proportions of the pulleys J' and $J^2$.

While I have illustrated only the combination of the disks in Fig. 1, the foregoing descriptions apply to and are sufficient without giving further details to show how the combinations with the sets of disks, Figs. 2, 3, and 4, will operate. While I have shown, also, only chain or band gearing between the parts, it is obvious that toothed gearing or ratchet and pinion could be used instead, or other equivalents, in certain of the parts.

Having thus described and illustrated the operation of this my invention, what I claim, and desire to secure by Letters Patent, is—

The combination of the two disks D' and $D^2$, pivoted eccentrically and geared to each other, as described, having pulleys or axles F' and $F^2$, provided with power and brake chains, respectively, all substantially as set forth.

GEO. HARRISON.

Witnesses:
DAVIS HAWLEY,
WILLIAM ABNER HORR.